US010233887B2

(12) United States Patent
Capozzella et al.

(10) Patent No.: US 10,233,887 B2
(45) Date of Patent: Mar. 19, 2019

(54) PERMANENT MAGNET ELECTRIC MOTOR FOR AN INTERNAL COMBUSTION ENGINE AND RELATED STARTING CONTROL SYSTEM

(71) Applicant: Piaggio & C. S.p.A., Pontedera (PI) (IT)

(72) Inventors: Paolo Capozzella, Pontedera (IT); Jury Cantini, Pontedera (IT); Jeanpaul Milani, Pontedera (IT)

(73) Assignee: PIAGGIO & C. S.P.A., Pontedera (PI) (IT)

( * ) Notice: Subject to any disclaimer, the term of this patent is extended or adjusted under 35 U.S.C. 154(b) by 0 days.

(21) Appl. No.: 15/320,990

(22) PCT Filed: Jul. 29, 2015

(86) PCT No.: PCT/IB2015/055713
§ 371 (c)(1),
(2) Date: Dec. 21, 2016

(87) PCT Pub. No.: WO2016/016812
PCT Pub. Date: Feb. 4, 2016

(65) Prior Publication Data
US 2017/0198673 A1     Jul. 13, 2017

(30) Foreign Application Priority Data

Aug. 1, 2014   (IT) .............................. RM2014A0447

(51) Int. Cl.
*F02N 11/04*     (2006.01)
*H02K 29/08*    (2006.01)
(Continued)

(52) U.S. Cl.
CPC .............. *F02N 11/04* (2013.01); *F02N 11/08* (2013.01); *H02K 5/225* (2013.01); *H02K 11/215* (2016.01);
(Continued)

(58) Field of Classification Search
CPC ...... F02N 11/04; F02N 11/08; F02N 2200/02; H02K 11/215
See application file for complete search history.

(56) References Cited

U.S. PATENT DOCUMENTS 4,841,216 A * 6/1989 Okada ..................... F02N 11/04
290/38 R
5,458,098 A   10/1995 Yagi et al.
(Continued)

FOREIGN PATENT DOCUMENTS

EP   1046813 A1   10/2000
EP   1233175 A1    8/2002
(Continued)

*Primary Examiner* — Joseph Dallo
(74) *Attorney, Agent, or Firm* — Volpe and Koenig, P.C.

(57) ABSTRACT

An electric motor for starting internal combustion engines and a relative starting control system of such engine comprising said electric motor of the type with permanent magnets allows a more effective and simpler management of the internal combustion engine thereto the electric motor is connected, wherein a monitoring unit of the electric motor (EMU) and a monitoring unit of the internal combustion engine (ECU) are provided, wherein the electric motor comprises a direction sensor (18) providing a signal representing the rotation direction of the rotor (12) of the electric motor, which is connected to said monitoring unit of the internal combustion engine (ECU).

3 Claims, 5 Drawing Sheets

(51) Int. Cl.
  *H02P 6/16*        (2016.01)
  *H02K 5/22*        (2006.01)
  *H02K 11/215*      (2016.01)
  *F02N 11/08*       (2006.01)
  *F02D 41/00*           (2006.01)
  *H02P 6/30*            (2016.01)

(52) U.S. Cl.
  CPC ............ *H02K 29/08* (2013.01); *H02P 6/16* (2013.01); *F02D 41/009* (2013.01); *F02N 2200/02* (2013.01); *F02N 2250/04* (2013.01); *H02P 6/30* (2016.02)

(56) References Cited

U.S. PATENT DOCUMENTS

| | | | |
|---|---|---|---|
| 5,713,320 A | 2/1998 | Pfaff et al. | |
| 6,218,750 B1* | 4/2001 | Nakagawa | H02K 29/08 310/68 B |
| 7,095,155 B2* | 8/2006 | Takeuchi | H02P 6/16 310/266 |
| 2003/0038482 A1* | 2/2003 | Dubus | F02N 5/04 290/36 R |
| 2004/0021457 A1 | 2/2004 | Johnson | |
| 2005/0116558 A1* | 6/2005 | Yokoyama | A61B 6/56 310/68 B |
| 2005/0216177 A1 | 9/2005 | Kassner | |
| 2007/0057511 A1* | 3/2007 | Taspinar | F02N 11/04 290/22 |
| 2007/0204827 A1* | 9/2007 | Kishibata | F02N 11/08 123/179.5 |
| 2008/0105230 A1 | 5/2008 | Kishibata et al. | |
| 2009/0033166 A1* | 2/2009 | Takeuchi | H02K 7/14 310/156.01 |
| 2009/0096310 A1* | 4/2009 | Takeuchi | H02K 15/026 310/156.36 |
| 2013/0113400 A1* | 5/2013 | Kishimoto | H02P 6/16 318/400.14 |
| 2016/0111985 A1* | 4/2016 | Yoneda | H02P 6/08 180/446 |
| 2016/0261155 A1* | 9/2016 | Lee | H02K 29/10 |

FOREIGN PATENT DOCUMENTS

| | | |
|---|---|---|
| EP | 1321666 A1 | 6/2003 |
| EP | 1396629 A2 | 3/2004 |
| EP | 1574692 A1 | 9/2005 |
| EP | 2149975 A1 | 2/2010 |
| JP | 2007132335 A | 5/2007 |

* cited by examiner

PERMANENT MAGNET ELECTRIC MOTOR FOR AN INTERNAL COMBUSTION ENGINE AND RELATED STARTING CONTROL SYSTEM

The present invention relates to an electric motor of the type with permanent magnets, apt to be coupled with the crankshaft of an internal combustion engine for acting as starter motor and as electric generator, and to the relative starting control system of the internal combustion engine including it.

In particular, this electric motor has to perform the starting procedure in internal combustion engines wherein the automatic switch-off of the engine is provided when the vehicle is stopped, and preferably suits to single-cylinder engines for motorvehicles such as scooters and the like, wherein the electric motor, which obviously even acts as generator, is fitted directly onto the crankshaft.

In this configuration, the electric motor is equipped with particular sensors, which are used by a monitoring unit of the electric motor and by a monitoring unit of the internal combustion engine to manage the above-mentioned procedures.

To this purpose, when the engine has to be re-started, that is when the engine switches-off as the vehicle has stopped, a re-starting procedure is used providing the rotation of the electric motor for arranging the piston, inside the cylinder, in the position requiring the lowest possible torque for the re-starting, by keeping in mind that the latter has to take place during a very short instant, by absolutely avoiding the piston stall inside the cylinder.

The U.S. Pat. No. 5,458,098 A describes a procedure of this type, devised for multi-cylinder engines of automobile type.

Generally, the electric motor in this phase is rotated with a limited torque therefore the piston cannot exceed the upper dead centre corresponding to the compression phase, by rotating the crankshaft both back and forth.

In the above-mentioned document, upon each stop a backward rotation is performed, said inverse rotation to move away the pistons from the more proximate compression phase: as from that moment the electric motor is rotated forward for starting, the inertia which is accumulated during the forward rotation allows overcoming the more proximate compression phase by re-starting the engine, even if the torque would not have been sufficient to overcome it by starting from a much more approached phase.

The inverse rotation is performed by a pre-established rotation angle ($\pi/4$ in case of a four-cylinder engine wherein there is a compression phase every $\pi/2$ of rotation) or for a pre-established rotation time, provided that the piston does not lock the inverse rotation before.

However, in a single-cylinder engine, the adjacent compression phases are spaced apart therebetween, in terms of angle of rotation by a $2\pi$ angle, and therefore it is difficult establishing a fixed inverse rotation angle and/or time to be sure of performing the re-starting.

Even in the U.S. Pat. No. 5,713,320 A, a procedure similar to the previous one is described, wherein the electric motor is rotated inversely with low power, until reaching the more proximate compression phase.

The European patent Nr. 1,046,813 describes an inverse rotation procedure, wherein the intervention of a sensor is provided, detecting the friction during it, to understand when the inverse rotation can cease.

On the contrary, the European patent Nr. 1,233,175 describes a procedure using a sensor capable of detecting the absolute angular position of the crankshaft.

The European patent Nr. 1,321,666 describes still a procedure wherein the inverse rotation angle applied to the crankshaft is detected.

The European patent application Nr. 1,396,629 A2 describes a starting control system of an internal combustion engine wherein a position sensor is used to provide, together with other position sensors, a signal representing the way of the rotation direction.

The US patent application Nr. 2008□00105230 describes another control system providing three voltage sensors and a phase sensor, all connected to a monitoring unit of the internal combustion engine.

At last, the European patent Nr. 1,574,692 describes a starting control system of an internal combustion engine wherein the rotation direction of the electric motor, and then of the internal combustion engine, is detected by the sequence of the phase pulses coming from the phase sensors with Hall effect existing in the electric motor of the type with permanent magnets.

This piece of information, supplied to the monitoring unit of the internal combustion engine apart from the monitoring unit of the electric motor, of the starting control system, is also used to detect the forward rotation of the engine during starting, phase wherein the supply of electric current and fuel mix to the internal combustion engine is allowed.

Such system, wherein the same monitoring unit of the internal combustion engine has to manage three sensors instead of only one, occupies an excessive portion of the calculation resources available to the monitoring unit regulating the engine starting.

The technical problem underlying the present invention consists in providing an electric motor allowing to overcome the drawbacks mentioned with reference to the known art.

Such problem is solved by an electric motor with permanent magnets as specified above, comprising a stator in the reinforcement thereof phase sensors are provided, wherein an additional sensor with Hall effect is provided, supplying a signal representing the rotation direction of the rotor of the electric motor.

Such problem is also overcome by a starting control system of an electric combustion engine comprising an electric motor with permanent magnets, a monitoring unit of the electric motor and a monitoring unit of the internal combustion engine, wherein the electric motor comprises a direction sensor providing a signal representing the rotation direction of the rotor of the electric motor, which is connected to said monitoring unit of the internal combustion engine.

The main advantage of the electric motor and of the starting control system including it according to the present invention lies in allowing a more effective and simpler management of the internal combustion engine thereto the electric motor is connected.

The present invention will be described hereinafter according to a preferred embodiment example, provided by way of example and not with limitative purpose by referring to the enclosed drawings wherein.

Figure 6:
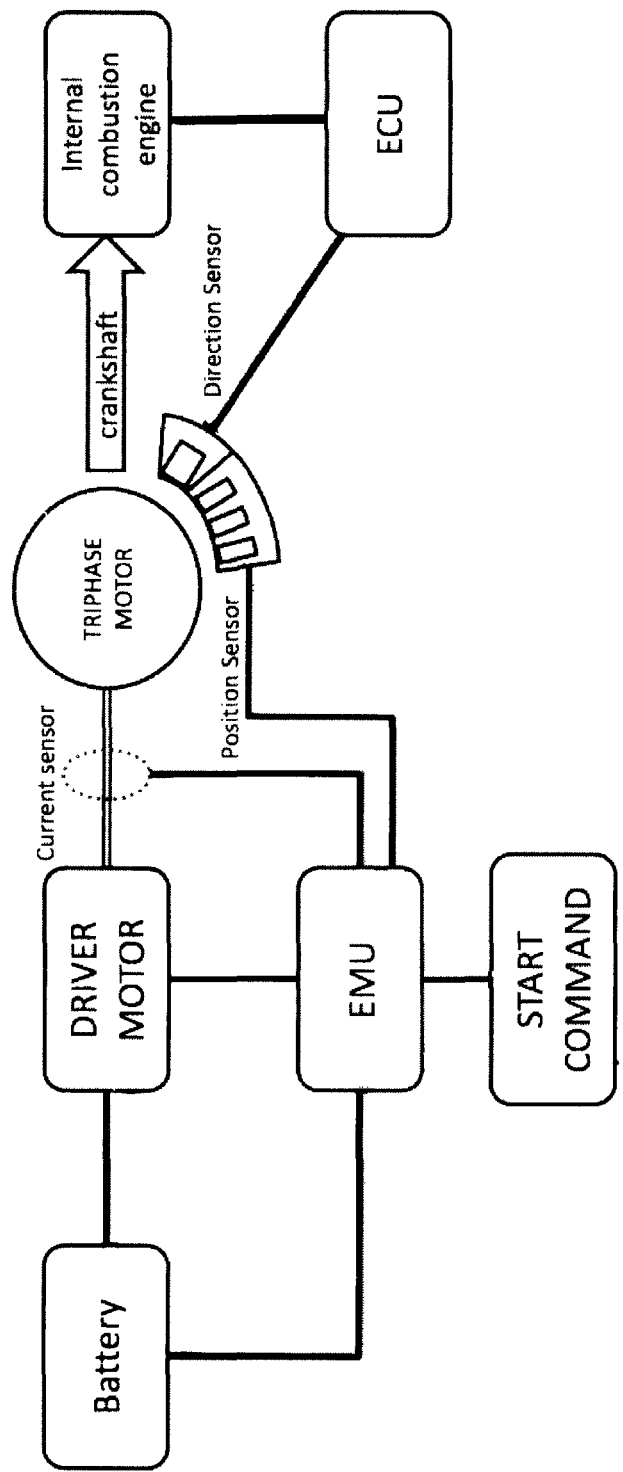
FIG. 6 shows a scheme of a starting control system according to the invention including the electric motor of the previous figures, and which performs a starting process with the electric motor according to the present invention.

By firstly referring to FIG. 6, as preliminary introduction a starting control system is described apt to perform the starting process with the electric motor of the present embodiment example.

It comprises a three-phase electric motor, of the brushless type with permanent magnets (THREE-PHASE MACHINE) which is driven by an actuating device (MOTOR DRIVER) which in turn receives electric current from a battery.

Both the actuating device and the battery are managed by a monitoring unit of the electric motor (EMU) arranged to receive a command for igniting the motor from a suitable input (START COMMAND). In the specific case, this input can receive a signal generated by a button, by the rotation of a key, by the opening of the throttle valve of the carburettor deriving from an accelerator, by the shifting or by the detection of a pressure on the accelerator command and so on.

The last two types of signals are those used in case of an engine and a starting system arranged for switching-off the engine upon each vehicle stop, or upon each stop exceeding a certain duration, to start it again automatically when the driver shows the intention to continue running as if the engine had not been previously switched-off.

The engine monitoring unit (EMU) receives a piece of information relating the current supply to the electric motor from a suitable electric sensor (Current sensor); it further receives pulses which are representative of the relative position of the rotor of the electric motor with respect to the stator from phase sensors, typically with Hall effect, arranged in the electric motor.

In the present embodiment example such pulses are phase pulses generated by the phase sensors of the stator of the electric motor (Position sensor), or the three sensors with Hall effect therewith the stator is equipped.

The electric motor is mechanically connected to the internal combustion engine directly by means of the crankshaft, which coincides with the shaft of the electric motor.

Furthermore, the stator of the electric motor is even equipped with a particular direction sensor, which will be detailed hereinafter, supplying a signal representing the rotation direction of the rotor with respect to the stator.

Such signal is not collected to the monitoring unit of the electric motor, but to a monitoring unit of the internal combustion engine (ECU) regulating the power supply of the internal combustion engine, that is the sparking plugs, and the supply of the fuel mix.

By referring to the present embodiment example, such starting control system is arranged for a single-cylinder four stroke engine of substantially motorcycle type.

By referring instead to the figures from one onwards, the electric motor of the present embodiment example is described in greater detail.

The engine é of the type with permanent magnets and it has three phases, with a rotor constituted by nine teeth, divided into groups made of three teeth for each phase.

This type of electric motor is particularly suitable to be assembled on the axis of the crankshaft of a four stroke engine, in particular a single-cylinder engine, for acting both as starter motor and as generator.

Figure 1:
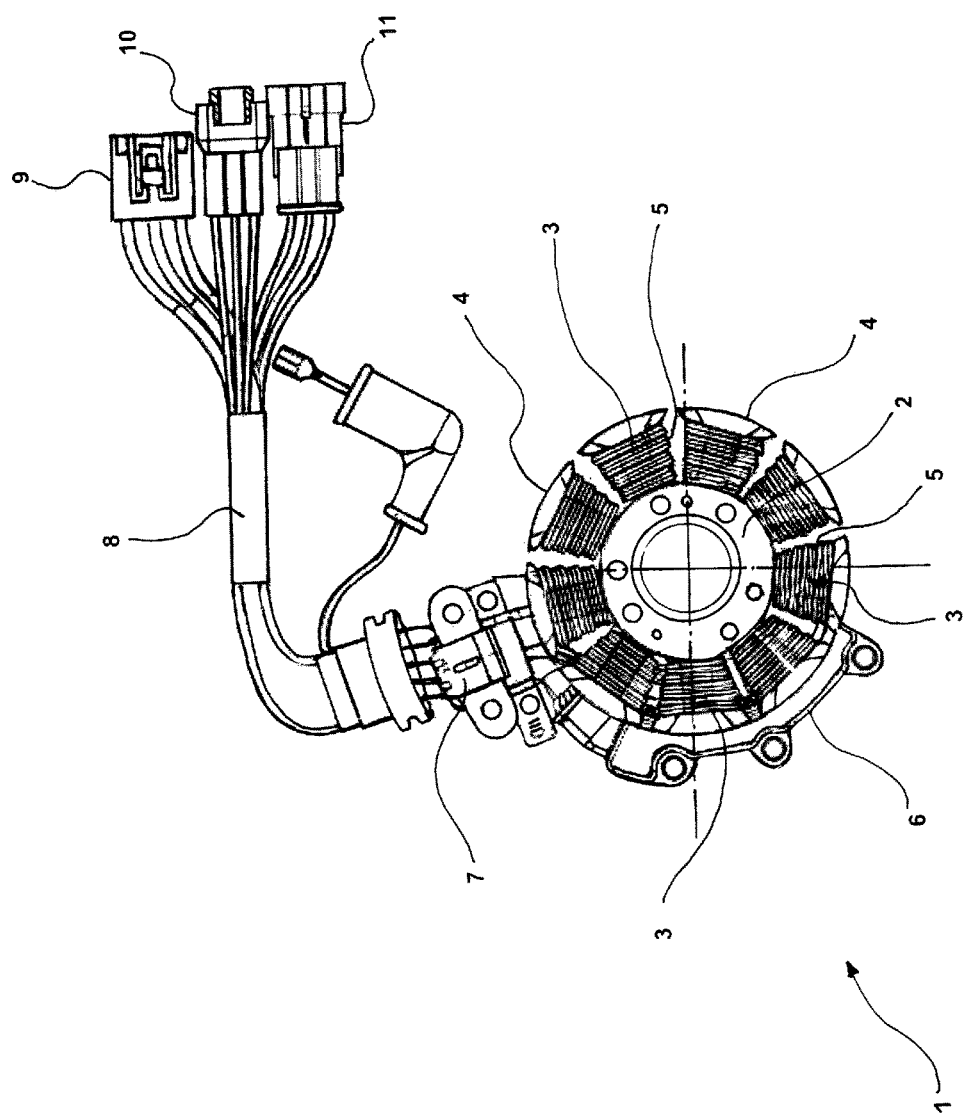
FIG. 1 shows a side view of the stator of an electric motor according to the present invention.
Figure 3:
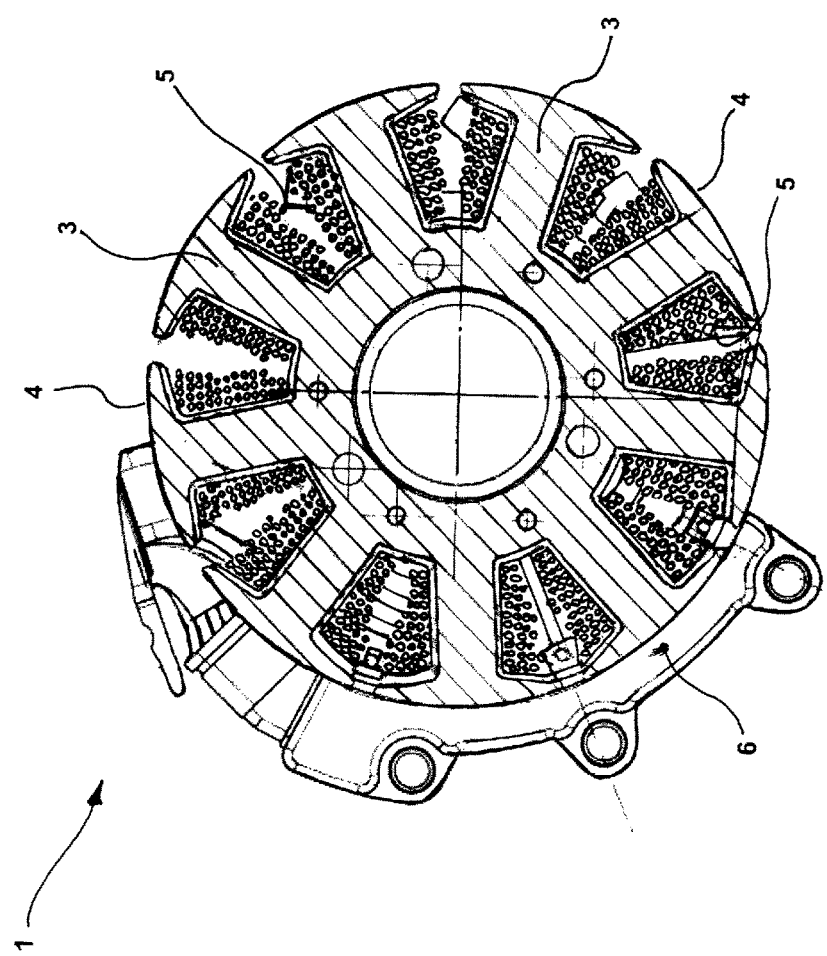
FIG. 3 shows an enlarged detail of the section of FIG. 2.

It comprises a stator illustrated in cross-section and it is designated with 1 in FIGS. 1 and 3.

The stator 1 is implemented in an element full of a ferromagnetic material comprising a central core 2 there from a plurality of the teeth 3 extend outside and radially, each one ending with an enlarged head 4, so as to implement between tooth and tooth a compartment which is filled-up with windings 5 of conducting wire made of copper arranged around each tooth.

The teeth 3 then have an outer joining surface formed by the respective heads 4.

Figure 2:
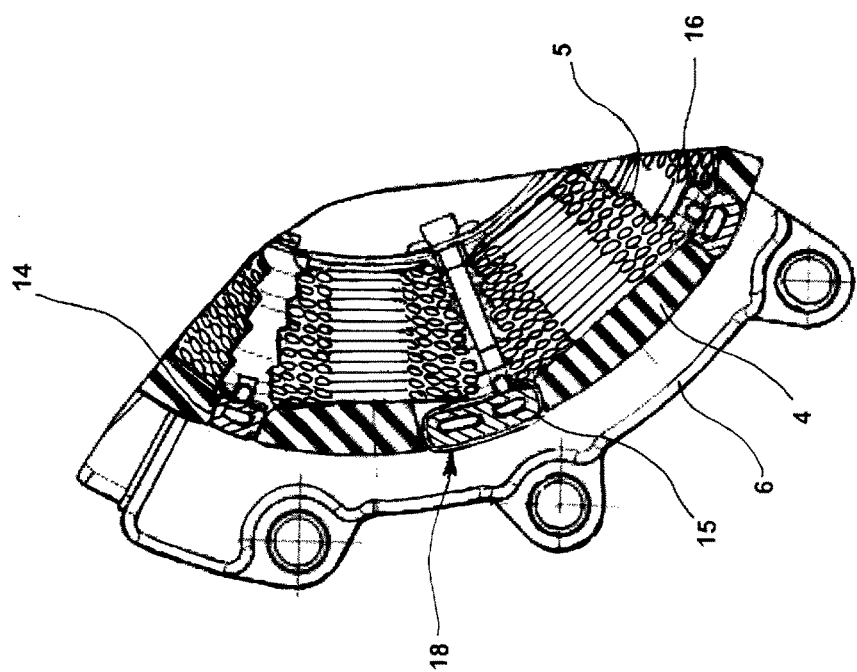
FIG. 2 shows a cross section of the stator of an electric motor of FIG. 1.

The stator 1 further comprises an outer reinforcement portion 6 occupying a circular sector of the stator (FIG. 2). The cables of all windings branch therefrom through a connecting element 7 outside the stator 1, then joined to the inside of a sheath 8 and connected to a respective plug 9 which will be connected to the battery.

From the reinforcement portion 6 even other cables branch, connected to Hall sensors (FIG. 2), generally phase position sensors, placed between said reinforcement portion 6 and the teeth 3 positioned therein.

The sheath 8 even includes said other cables, then connected to respective connectors 10 and 11.

As said previously, the teeth 3 are divided into three groups, each one corresponding to a phase: the teeth of each group are adjacent therebetween and thus occupy a single circular sector of the stator 1, with the width of 120°.

The windings are implemented by a plurality of turns of the same wire made of enamelled copper, arranged on several layers on the same tooth.

Figure 4:
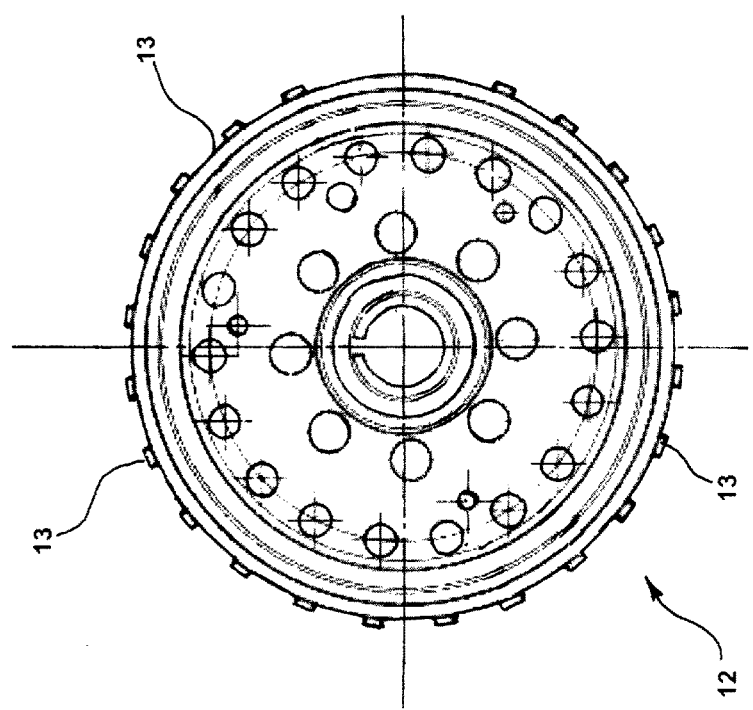
FIG. 4 shows a side view of the rotor of an electric motor according to the present invention.

The electric motor further comprises a rotor 12 (FIG. 4), connected to the not represented crankshaft which comprises, at its own crown, a plurality of suitably spaced-apart permanent magnets 13.

By referring to the previously mentioned Hall sensors, they are arranged equidistant at free spaces between adjacent heads 4, under the reinforcement portion 6.

Figure 5:
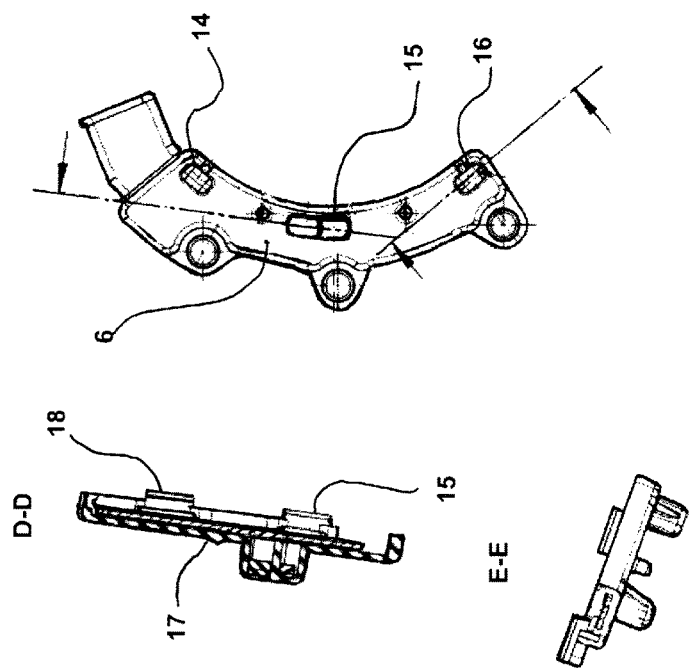
FIG. 5 shows an enlargement of a portion of the stator of FIG. 1, with highlighted some constructive details.
Figure 5A:
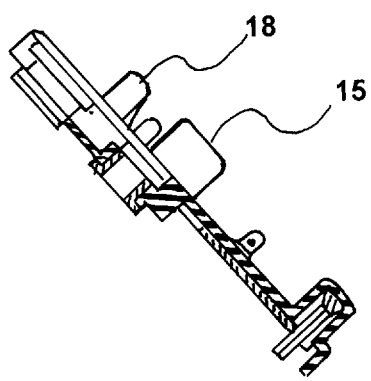
FIGS. 5A and 5B show additional constructive details related to the stator portion of FIG. 5.
Figure 5B:
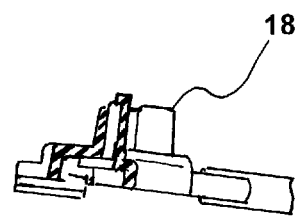
Figure 5B:
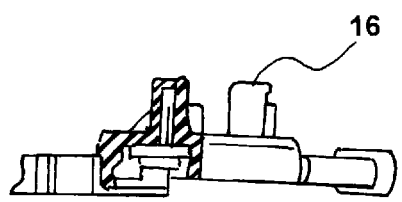

They are three: a first phase sensor 14, a second phase sensor 15 and a third phase sensor 16 (FIG. 5B, section A-A).

The second phase sensor 15, which is in the centre of the other two, is arranged in an enlarged compartment of the reinforcement portion 6 (FIG. 5, section D-D) receiving even a direction sensor 18 (FIG. 5A, sections B-B and C-C).

In this embodiment example, the direction sensor 18 is a double-channel sensor with Hall effect and it is capable of providing a signal indicating the rotation direction of the rotor 12 with respect to the stator 1.

This signal, for example 0 for the forward rotation and 1 for the inverse rotation, does not provide phase pulses.

It is then particularly suitable to inhibit (inverse rotation) or to allow (forward rotation) the power supply to the sparking plug and the fuel mix in the chamber, from the monitoring unit of the combustion engine (ECU), which will receive directly this signal.

To the above-described electric motor a person skilled in the art, to the purpose of satisfying additional and contingent needs, could introduce several additional modifications and variants, however all within the protective scope of the present invention, as defined by the enclosed claims.

The invention claimed is:

1. A starting control system of a combustion engine comprising an electric motor with permanent magnets, a monitoring unit of the electric motor (EMU) and a monitoring unit of the internal combustion engine (ECU), wherein the electric motor comprises:
- a first phase sensor, a second phase sensor and a third phase sensor, each one providing a phase signal to the monitoring unit of the electric motor (EMU); and
- an additional direction sensor providing a signal representing a rotational direction of the rotor of the electric motor to the monitoring unit of the internal combustion engine (ECU).

2. The electric motor according to claim 1, wherein said additional direction sensor is arranged at one of the phase sensors (15).

3. The electric motor according to claim 1, wherein said additional direction sensor is a double-channel sensor with Hall effect.

* * * * *